D. W. RANTINE.
CLOTHES LINE TIGHTENER.
APPLICATION FILED MAY 4, 1910.
984,604.
Patented Feb. 21, 1911.
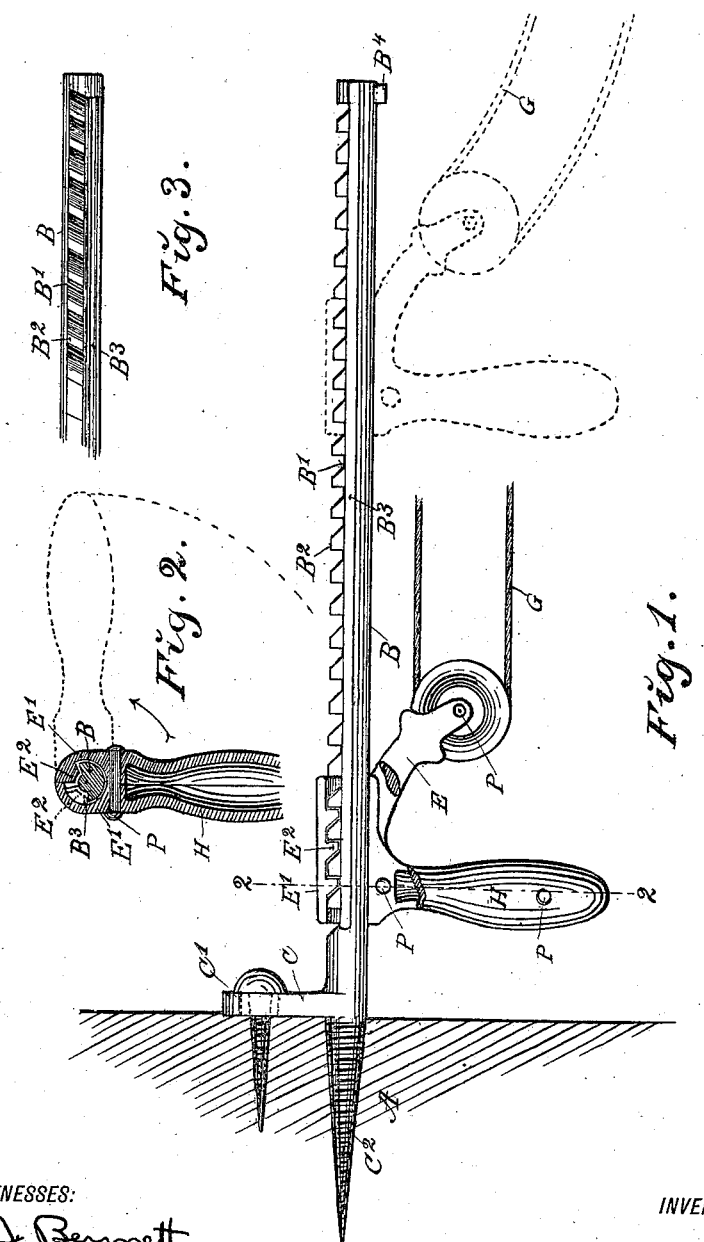
WITNESSES:
INVENTOR
Daniel W. Rantine

UNITED STATES PATENT OFFICE.

DANIEL W. RANTINE, OF NEW YORK, N. Y.

CLOTHES-LINE TIGHTENER.

984,604.  Specification of Letters Patent.  Patented Feb. 21, 1911.

Application filed May 4, 1910. Serial No. 559,277.

*To all whom it may concern:*

Be it known that I, DANIEL W. RANTINE, a citizen of the United States, and resident of Brooklyn borough, in the county of Kings, city and State of New York, have invented a certain new and useful Clothes-Line Tightener, of which the following is a specification.

My invention relates to improvements in clothes-line tighteners in which the line supporting pulley is journaled in a fork or frame which is slidably mounted on a stationary toothed bar or rack.

My improvement is more particularly designed to advance the durability of life of ropes or lines where a long stretch or distance is between the supports or pulley posts, and the lines or ropes will require more attention and adjusting for varying kinds of work. To attain this object I have reduced to practice my invention by constructing the devices and mechanism illustrated in the drawing following this specification. In these drawings every reference letter refers always to the same part.

Figure 1 is a longitudinal side view of the entire apparatus and a portion of a post or support in section is shown therewith. A part of the pulley-frame or yoke which takes over the toothed-bar or rack is left off to give a clear view of the interior devices or tooth-sets in the construction, and by dotted lines showing the pulley and the cylindrical shell or yoke transferred to the outward end on the rack. Fig. 2 is a cross section on line 2—2 in Fig. 1, and Fig. 3 is a top view of a portion of the toothed-bar or rack, showing the preferred standing of the teeth for purposes which will be further fully described.

The main part or toothed bar B has one portion of its shank made to a screw $C^2$ and to a flange C having a screw hole $C^1$ through which a screw is fastened to the support or post A. The advantage in having the rack or bar B secured to the support by two screws is to prevent it from turning while the pulley and frame E and the pulley shell $E^1$ is turned on this rack. A set of teeth $B^2$ is on this rack forming a plurality of holds or pockets $B^1$. Along the side of the toothed surface on the bar B is made a groove $B^3$ and a stop pin $B^4$ is on the far end on the rack. The object of the teeth on the rack is to hold the pulley construction from sliding on the rack, and the object of the groove $B^3$ is to allow the pulley construction to slide when required and the pin or stop $B^4$ prevents the pulley accidentally sliding off from the rack.

Over the rack B is mounted the pulley holder yoke or shell E having a set of interior teeth $E^2$ which corresponds to the teeth $B^2$ on the rack. The rearward lower portion of this toothed shell is made to a handle H. This handle, the pulley-fork and the toothed shell are constructed of two half parts which are united or fastened together by the rivets P seen in Figs. 1 and 2.

The operation of this apparatus is easily understood by remembering that the rack or bar B is stationary and the pulley construction is partly turnably and also slidably mounted on this rack, and by turning the pulley shell on the rack it can be engaged with or released from engagement with the toothed rack. In the first instance, the pulley is drawn rearward, this tightens the line G as seen in Fig. 1 and the teeth of the rack acting against the teeth of the pulley-shell holds the said pulley and line in this position and the locking teeth having a slanting direction (as shown in Fig. 3) toward the outward end will hold better when weight is on the line G. To loosen the line and the pulley from this last named engagement, the handle H is turned to the direction shown by the arrow in Fig. 3. This will bring the teeth $E^2$ of the shell $E^1$ into the groove $B^3$ of the rack or bar B. This groove is open to the whole length of the bar and allows the pulley to be slid forth or back and when slid toward the outreaching end the line G will be loose as shown by the dotted lines in the Fig. 1.

Having thus described my invention so clearly that anyone skilled in the art to which it appertains is able to make and use the same what I claim is:

A clothes line tightener comprising a bar having means for attachment to a suitable standard and provided with a longitudinally extending groove, teeth on said bar alongside said groove, a line pulley support slidable and rotatably mounted on said bar, teeth on said support adapted to engage said bar teeth in one position to which the said support is rotated, to hold the line in fixed position, the teeth on said support being adapted, in another position, to lie in said groove to permit free longitudinal movement of said support along said bar
5 and a handle on said line pulley support for manipulating the same.

In testimony whereof I have signed my name to this specification in the presence of two subscribing witnesses.

DANIEL W. RANTINE.

Witnesses:
WM. H. MARQUAND,
ROBERT J. BENNETT.